March 21, 1933.   J. McEACHERN   1,902,252
COMBINATION GRAIN DUMP
Filed April 20, 1931   5 Sheets-Sheet 1

Inventor
John McEachern

March 21, 1933.  J. McEACHERN  1,902,252
COMBINATION GRAIN DUMP
Filed April 20, 1931  5 Sheets-Sheet 2

Inventor
John McEachern

March 21, 1933.   J. McEACHERN   1,902,252
COMBINATION GRAIN DUMP
Filed April 20, 1931   5 Sheets-Sheet 3

Inventor
John McEachern

Inventor
John McEachern

Patented Mar. 21, 1933

1,902,252

UNITED STATES PATENT OFFICE

JOHN McEACHERN, OF WINNIPEG, MANITOBA, CANADA

COMBINATION GRAIN DUMP

Application filed April 20, 1931. Serial No. 531,512.

This invention relates to improvements in combination grain dumps and an object of the invention is to provide a grain dump which is combined with and forms a part of the conventional weighing scale platform which will efficiently provide for the dumping of vehicles driven onto the platform.

A further object of the invention is to provide a device of this character in which the hoisting platform will automatically and positively retain the wheels of a vehicle when the platform is raised.

A further object of the invention is to provide a device of this character in which the hoist may be locked at a plurality of levels.

A further object of the invention is to provide a device of this character in which the hoisting platform is positively prevented from twisting or turning during the operation of raising.

A still further object of the invention is to provide an improved construction which will more efficiently perform the functions required of it.

With these and other objects in view the invention consists essentially of hoisting mechanism associated with the scale platform, the hoisting platform being formed with movable plates or sections to accomodate and positively retain the wheels of a vehicle resting thereupon, the hoist being preferably operated through pneumatic means with the provision of a control for locking the hoist at a plurality of levels and means for preventing the hoist from twisting or turning during operation and means associated with the platform for supporting the vehicles during the raising operation, as more fully described in the following specification and illustrated in the accompanying drawings which form part of the same.

Referring to the drawings.

Referring more particularly to the drawings, A indicates the scale platform which is mounted in the usual manner in the weigh-house floor 10 and provided with the usual weighing mechanism such as the scale arms 11 and other associated parts. Within the scale platform is mounted a hoist indicated by the letter B, including a cylinder 12 which is adapted to extend vertically below the scale platform and is braced therefrom with any suitable braces 13 connected to the lower end of the cylinder as at 14.

Within the cylinder operates the piston 15 which is provided with the usual piston rod 16 preferably in the present case, of hollow cylindrical form which terminates at its opposite end in the head casting 17. Secured to the head casting 17 is the central stationary top plate 18 of the hoist platform C. The top plate 18 is preferably flanged as at 19 and by means of the bolts 20 a pair of parallelly disposed I-beams 21 are secured, the I-beams forming the framework of the hoist platform. To each side of the top plate 18 of the hoist platform are positioned the movable plates or sections 22 and 23 of the hoist platform, these plates being inserted as clearly illustrated in Figure 4 between the inside surface of the webs 24 of the I-beams and are adapted to rest in normal lowered position against the underside of the inner flange 25 of the I-beams and in raised position are adapted to rest upon the upper side of the inner flanges 26 of the I-beams. In other words, the plates 22 and 23 are loosely associated with the I-beams and when the hoist platform C is flush with the scale platform A, through the medium of the projecting beams on the scale platform, or associated parts, the movable plates 22 and 23 are forced into bearing engagement with the underside of flanges 25 and thus these plates are practically flush with the scale platform.

Figures 3, 4:
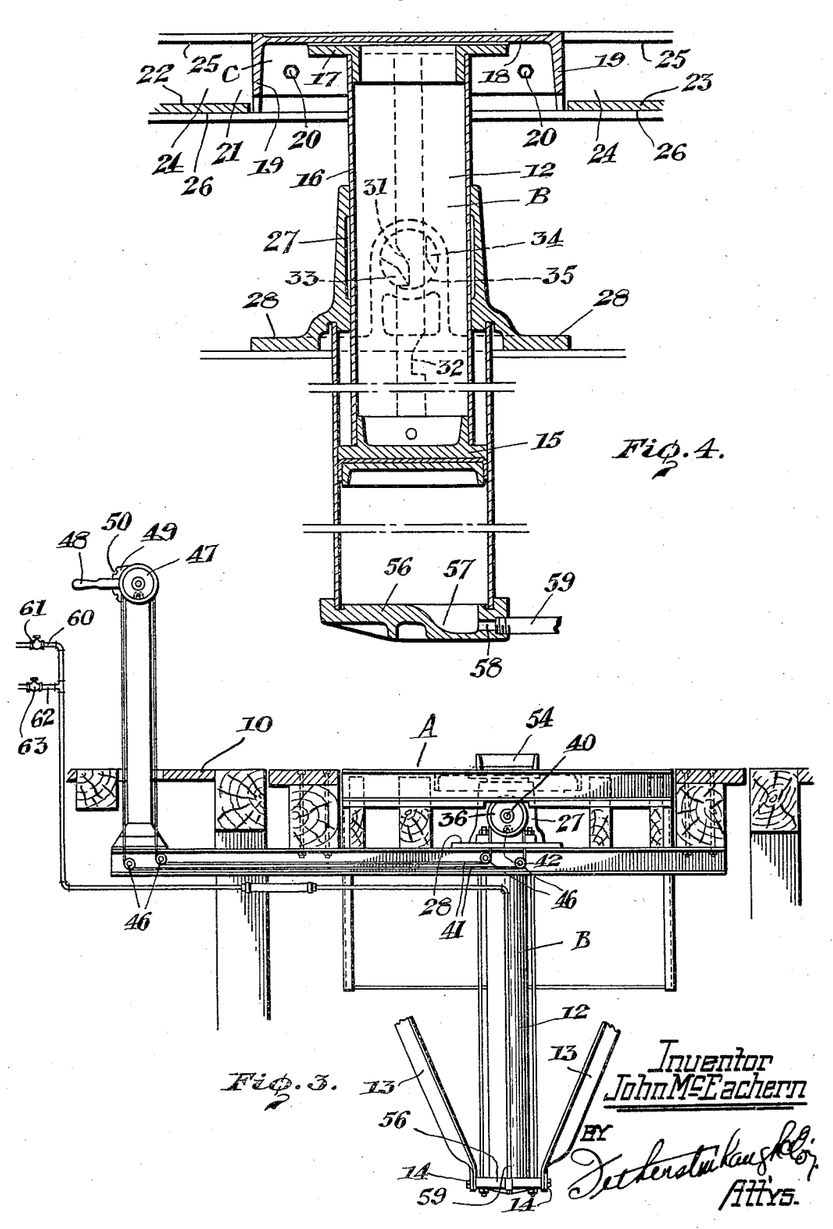
Figure 3 is a transverse sectional elevation of the scale platform and dumping mechanism illustrating the control mechanism therefor.
Figure 4 is a longitudinal sectional elevation of the hoist illustrating the piston and cylinder, the associated hoist platform and the locking mechanism therefor, and illustrating the movable plates in their lower position.

However, when the hoist moves upwardly, the plates, of course, are held stationary by the projecting beams and are picked up by the lower flanges 26 of the I-beams 21 and thus form a fixed platform some distance below the surface of the I-beams.

Figure 1:
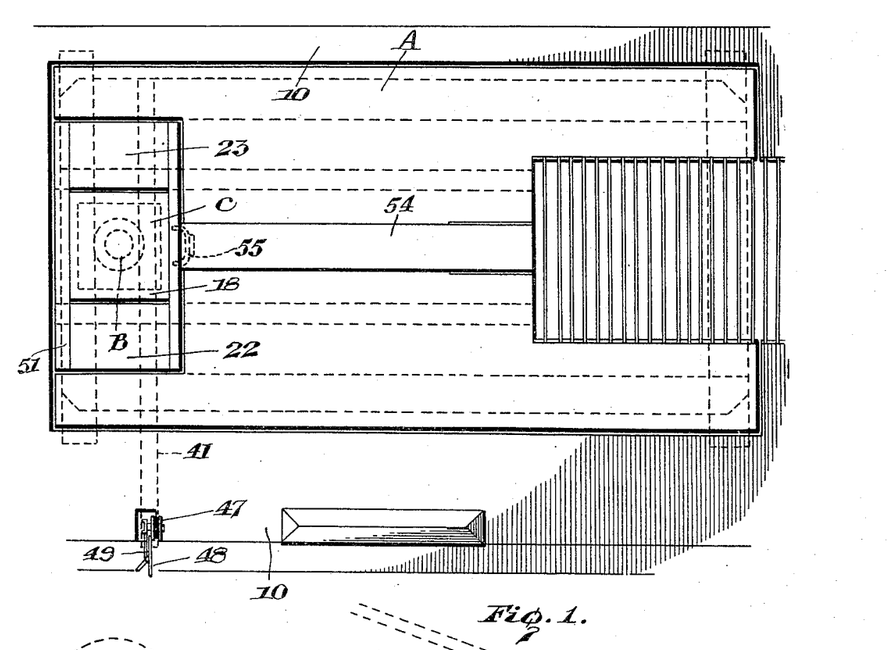
Figure 1 illustrates a plan view of the hoisting and grain dumping mechanism associated with the scale platform.
Figure 2:
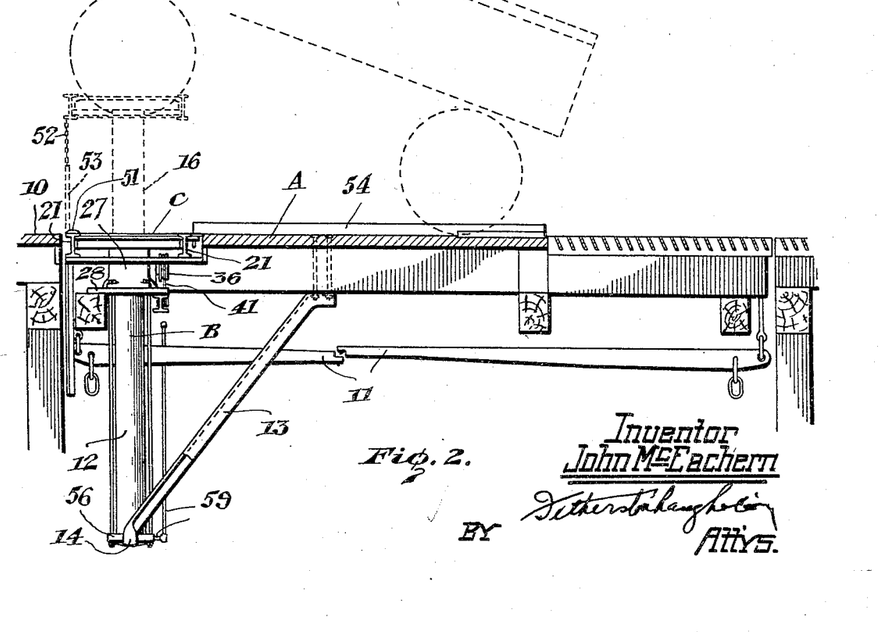
Figure 2 is a longitudinal sectional elevation of the scale platform and associated parts illustrating the position of the hoist relative thereto and its attached parts, with a vehicle in dumping position shown in dotted lines.

In referring particularly to Figure 1 it will be seen that the hoist platform is illustrated in raised position and it is apparent that the wheels of the vehicle are firmly locked between the I-beams and resting upon the plates 22 and 23 which in that position are firmly fixed. If the wheels under any circumstances get out of engagement with the hoist platform this locking action is practically automatic since when the hoist platform starts to raise the wheels gradually drop down onto this platform with the dropping of the plates.

Figure 6:
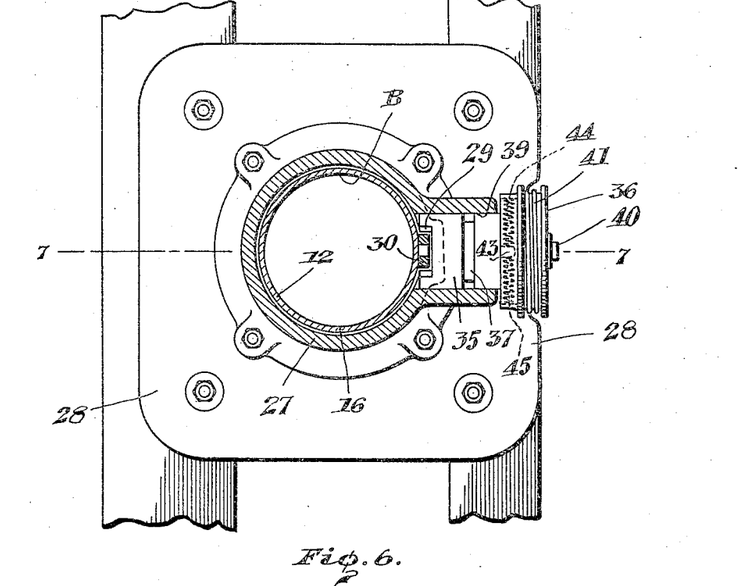
Figure 6 is a sectional plan view of the cylinder and locking mechanism therefor.

The piston rod is normally guided through the cylinder head 27 which rests upon the top of the cylinder and by means of the flanges 28 is secured to stationary parts of the supporting structure. The cylinder head, of course, closes that part of the top of the cylinder between the piston rod and the outer walls of the cylinder and as particularly illustrated in Figure 6, the head is channelled as at 29 and within this channel extends a combination guide rod and locking bar 30. This locking bar is attached to and forms part of the piston rod 16 and is of a length corresponding to the length of the piston rod. The locking bar is preferably rectangular in cross section and due to its sliding engagement with the sides of the channel 29 in the cylinder head, during the raising operating of the hoist this locking bar will prevent the piston rod and attached platform from rotating or twisting in any way so that the locking bar and cylinder head provide means for preventing the hoist from turning about its axis, effected by a co-operation between the piston and cylinder structure.

The locking bar, as particularly illustrated in Figure 4, is formed with notches or the like 31 and 32 on each side of the bar and these notches are so positioned as to correspond respectively with a low position of the hoist and intermediate position of the hoist so that when engaged by cooperating locking means the hoist may be retained in a low or intermediate position. Similarly when the locking means is not engaged with the notches the hoist may be raised to a high position or a maximum height.

Figure 5:
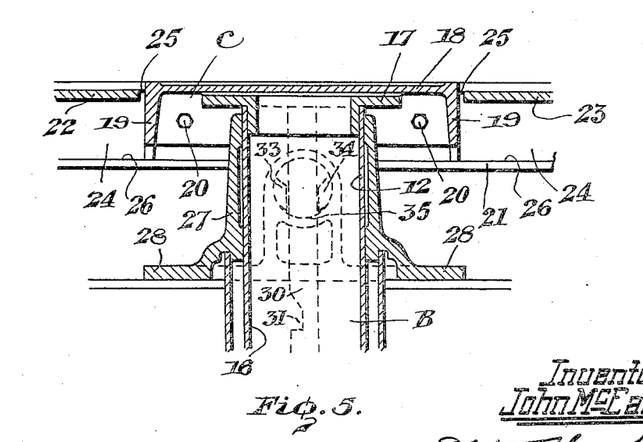
Figure 5 is a similar view to Figure 4 taken at right angles thereto, and illustrating the movable plates in their uppermost position.
Figure 7:
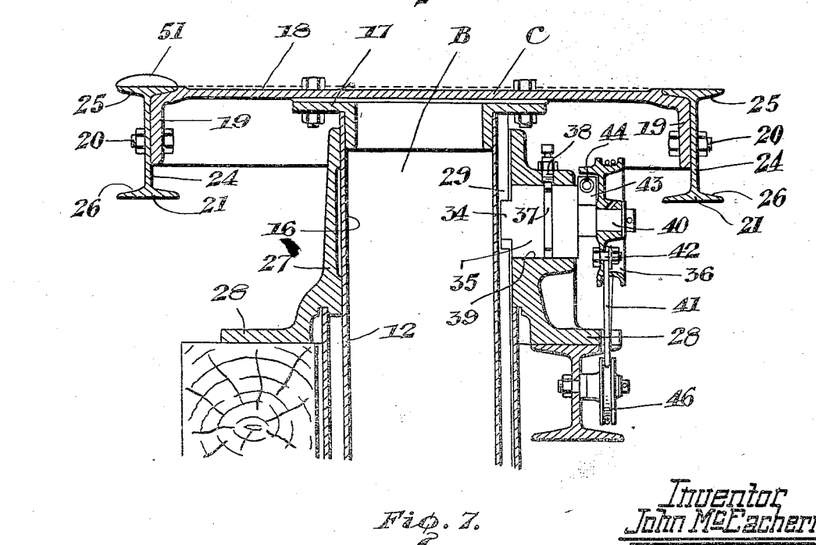
Figure 7 is a section taken on the line 7—7 of Figure 6.
Figure 8:
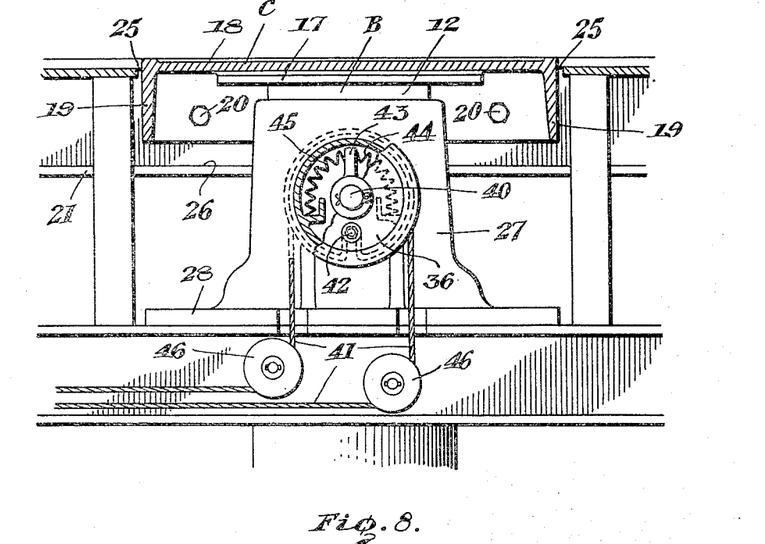
Figure 8 is a view in elevation of the hoist platform illustrating the locking mechanism and associated cylinder head.

The cooperating locking means for the notches is in the form of double acting pawls 33 and 34, see Figure 5, which are preferably formed integral with a cylindrical body 35 which is rotated in one direction or the other by means of an operating wheel 36. The cylindrical body is preferably formed with a guide channel 37 which is engaged by a guide screw or the like 38 positioned within the cylinder head 27, the cylindrical body 35 being rotatably mounted in a cylindrical passageway 39 formed in the cylinder head and permitting the pawls 33 and 34 to protrude therethrough and extend on each side of the locking bar 30. The operating wheel 36 is loosely mounted on the stub shaft 40, which forms an integral part of the cylindrical body 35. The wheel 36 is designed to receive therearound, a cable 41 and, as illustrated in Figure 7, the cable 41 is coiled around the wheel 36 and fixedly secured thereon by its passage over an anchoring bolt or the like 42, so that when the cable is pulled in one direction or the other the operating wheel will correspondingly move.

Rigidly secured to the shaft 40 is an actuating finger 43 so that when this actuating finger is turned in one direction or the other the cylindrical body will also move in the corresponding direction. The operating finger 43 is designed to extend adjacent to the operating wheel 36 and between two opposed coil springs 44 and 45 which are mounted on the operating wheel 36, thus when the operating wheel is turned in one direction or the other one of the coil springs 44 or 45 will be compressed against the finger 43 so that while the finger will not move due to the fact that the pawls 33 and 34 are rigidly held in their normal position by means of the locking bar, when the hoist is raised and one of the pawls comes opposite one of the notches, the pressure of the spring exerted against the finger 43 will cause the pawl in question to drop into the notch in question in the locking bar 30 so that the hoist will be immediately stopped in this position.

The cable 41 operating the wheel 36 passes over suitable pulleys or sheaves 46 and is designed to connect with a control member or wheel 47, in a similar manner to its connection with the operating wheel 36. A control lever 48 is rigidly secured to the wheel 47 and is designed to engage with a suitable quadrant 49 which is formed with notches therein 50, three in number which correspond with the high, intermediate and low positions of the hoist so that upon operating the lever 48 into one notch or the other the hoist may be caused to be raised to a corresponding position.

Figure 9:
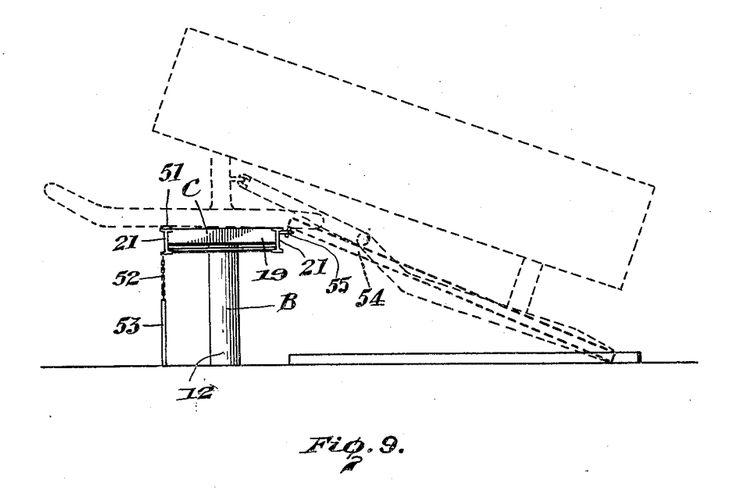
Figure 9 is a schematic view of the hoist illustrating a sleigh in dumping position thereon.
Figure 10:
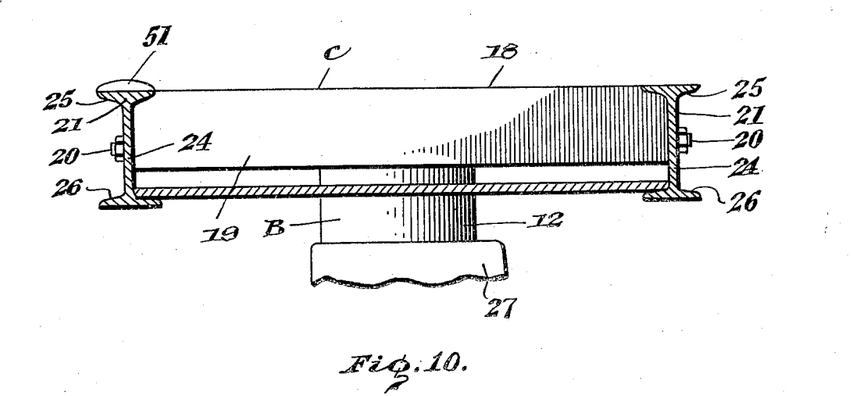
Figure 10 is a transverse section taken through the hoist platform illustrating the position of the movable plates when the hoist has been raised.

As particularly illustrated in Figure 9 one edge of the platform overlying one I-beam is formed with an upwardly projecting ridge preferably in the form of a bar 51 which is particularly adapted for maintaining one end of the runners of sleighs well above the surface of the hoist-platform so that the runners, when they are on this platform, will not contact in any way with the weigh-house floor and thus prevent the recording of the correct weight of the load. This ridge, of course, will also function as a stop member for the vehicle wheels when the vehicle is driven onto the weighing platform and the front wheels of the vehicle come to rest upon the hoist-platform.

From the same beam, suspended by means of chains 52, is a horse guard 53 in the form of a plate member which moves with the hoist-platform and consequently when this platform is raised above the level of the scale platform, this guard will prevent the hoofs of the horses from in any way getting underneath the hoist-platform. Thus, when the platform is lowered there is no danger that the horses' hoofs would be caught between the hoist-platform and the weigh-house floor.

The hoist-platform also carries an accessory for raising and keeping sleighs in position when they are used to deliver grain to the elevator. This accessory consists preferably in an iron beam 54 of channel formation which is hingedly and detachably secured to the hoist-platform as at 55 and is designed as illustrated in Figure 4 to lie along the scale platform when the hoist is in normal lowered position.

As seen in Figure 9, when the hoist-platform is in raised position, the beam 54 is in a sloped position and the free end of the beam will slide along the floor of the scale platform as the hoist-platform is raised. When the front of the sleigh is raised on the hoist, it is necessary for the rearward portion of the sleigh to move forward a little in relation to the scale platform. This movement is assisted by the beam 54 and it also keeps the sleigh from slipping back as the hoist-platform is raised. It will be noted that by providing a beam or member of this character no alteration of any character is necessary in the scale platform since the beam overlies this platform and will engage the rear cross bar of the sleigh between the runners so as to raise the rear runners from the scale platform at the same time as the front runners. The rear runners are not raised to the same degree but the engagement of the beam with the cross bar is such as to permit the runners to clear the platform, the combination providing for the raising of the front and rear of the vehicle to a sufficient angle to permit it to dump its contents and eliminating strain on the joining beam between the front and rear runners which otherwise would cause this member to break or to be damaged. This beam, as is readily apparent, is not in the way when wagons or trucks are moved onto the scale platform but, if it is desirable, the beam may be readily removed from its connection with the hoist-platform providing it is preferred to keep the platform clear in these circumstances.

The piston 15 is preferably operated pneumatically although it could be operated hydraulically. To this end the cylinder is formed with a base plate 56 which is provided with the internal recess 57 with which communicates the passageway 58. The conduit 59 communicates with passageway 58 and is fed by the supply conduit 60 which is provided with the usual control valve 61. Also communicating with the conduit 59 is an exhaust pipe line 62 provided with valve 63 so that, when valve 63 is closed and valve 61 is open, pressure medium will be supplied through the base 56 of the cylinder 12 and the hoist will be raised. The hoist, of course, will be retained in its raised position due to the pressure medium but, upon closing valve 61 and opening valve 63, the pressure medium will be allowed to escape from the cylinder and thus will return to its normal position through gravity.

In general operation, the vehicle is drawn onto the scale platform and the front wheels thereof, or in the case of a sleigh the front runners thereof, are caused to rest upon the hoist-platform in the area of the movable plates or sections 22 and 23. Depending upon the size of the vehicle or at the operator's discretion, the lever 48 of control member 47 is operated to its proper position to raise the hoist to a low, intermediate or high position as required. Upon operating the control member 47 through the cable 41, the operating wheel 36 is rotated in a clockwise or anti-clockwise direction and one of the springs 44 or 45 is caused to exert pressure upon the finger 43. This will in turn impart a pressure in one direction or the other, as the case may be, to the cylindrical body 37 carrying the pawls 33 and 34 and, when the hoist rises, either the pawl 33 or the pawl 34 will respectively engage with the notch 31 or notch 32 in the locking bar 30, depending upon the operation of the operating wheel 36, so that the hoist will be stopped in a low or intermediate position.

In the case where it is desired to raise the hoist-platform to the maximum or highest level, the control lever 48 is moved to the neutral position, in which case no pressure is exerted in either direction upon the finger 43 of operating wheel 36, so that the pawls 33 and 34 will remain in a position indicated in Figure 5 and the locking bar, upon moving upwardly with the piston rod, will not be stopped during any part of its travel and the hoist platform will, therefore, be raised to the maximum extent the piston is permitted to move in the cylinder 12.

Assuming that the proper position of the platform has been set by lever 48, valve 61 is operated to allow the pressure medium to flow from conduit 60 through conduit 59 and the pressure medium, therefore, is directed into the cylinder 12. In the ordinary manner, piston 15 is caused to move upwardly in the cylinder 12 and, when it reaches the desired position according to the setting of the lever 48, it will be stopped in that position. In the case of a wheeled vehicle, with the front wheels resting upon the hoist platform, as the platform is raised away from the scale platform, the movable plates 22 and 23 drop from their normal position, as previously described, and come to rest upon the inner flange 26 of the I-beams. Simultaneously, of course, the wheels of the vehicle will follow the plates and come to rest, as indicated in Figure 1, upon the upper surface of the plates 22 and 23 in their lowered position and also contact with the upper edges of the I-beams so that the vehicle is positively held on the hoist-platform and cannot move therefrom. The grain will then be discharged from the vehicle and will drop through the grating formed in the scale platform. Of course, the pressure medium in the cylinder will retain the hoist platform in its raised position until the valve 61 is closed and valve 63 in the exhaust line is opened, when the piston will resume its normal position and the hoist platform will again become flush with the floor of the scale platform.

As previously described, when the hoist platform is raised, any tendency of the piston rod towards turning about its axis or twisting, is completely offset by the locking bar 30 which extends downwardly through the channel 29 in the cylinder-head, so that the present structure provides a hoist which will positively hold the vehicle during the raising operation and will also provide against any foreign movement which would tend to dislodge the vehicle or hinder the work being carried out.

From the foregoing it will be seen that the outstanding features of the invention comprise the hoist platform structure, the locking means for the hoist, the means for preventing twisting or rotative movement of the piston rod and attached platform, the support for the main portion of a vehicle not carried by the hoist, the horse-guard and the means on the platform for keeping a vehicle from contacting with the weigh-house floor.

A most outstanding feature in the platform consists in the movable sections which form a cradle in the platform when the hoist is raised, to positively retain the vehicle wheels.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

What I claim as my invention is:—

1. In combination with a scale platform, grain dumping mechanism comprising a hoist in the form of a piston and cylinder mounted below the scale platform, a piston rod connected to said piston and adapted to project above the level of the scale platform during operation, a hoist platform mounted on said piston rod and adapted to be flush with the scale platform in normal position, said hoist platform including a framework made up of a central stationary section secured to said piston spacing movable sections designed to be displaced on upward movement of the hoist, means for operating the hoist, and means for stopping downward or upward movement respectively of the movable sections when said hoist is in raised or lowered position.

2. In combination with a scale platform, grain dumping mechanism comprising a hoist in the form of a piston and cylinder mounted below the scale platform, a piston rod connected to said piston and adapted to project above the level of the scale platform during operation, a hoist platform mounted on said piston rod and adapted to be flush with the scale platform in normal position, means for operating the hoist, a control member for controlling the upward movement of the hoist, and means responsive to a predetermined setting of said control member for automatically stopping said hoist at different predetermined levels.

3. In combination with a scale platform, grain dumping mechanism comprising a hoist in the form of a piston and cylinder mounted below the scale platform, a piston rod connected to said piston and adapted to project above the level of the scale platform during operation, a hoist platform mounted on said piston rod and adapted to be flush with the scale platform in normal position, a cylinder head adapted to surround the piston rod and close the top of the cylinder means for operating the hoist, means mounted in the cylinder head for automatically stopping and locking said hoist against upward movement at previously selected points, operating means independent of the hoist operating means for controlling the locking means.

4. In combination with a scale platform, grain dumping mechanism comprising a hoist in the form of a piston and cylinder mounted below the scale platform, a piston rod connected to said piston and adapted to project above the level of the scale platform during operation, a hoist platform mounted on said piston rod and adapted to be flush with the scale platform in normal position, means for positively locking said hoist platform at different levels, said locking means including a locking bar secured to the piston rod and provided with a plurality of notches therein and pawls carried by the cylinder adapted to selectively enter said notches, means for selectively operating said pawls, and means for operating the hoist.

5. In combination with a scale platform, grain dumping mechanism comprising a hoist in the form of a piston and cylinder mounted below the scale platform, a piston rod connected to said piston and adapted to project above the level of the scale platform during operation, a hoist platform mounted on said piston rod and adapted to be flush with the scale platform in normal position, a cylinder head adapted to surround the piston rod and close the top of the cylinder, means mounted in the cylinder head for locking said hoist at various levels including a locking bar secured to the piston rod and extending down through the cylinder head, a plurality of notches formed in the locking bar, a rotative body mounted within the cylinder head carrying a plurality of pawls adapted to selectively enter said notches, operating means for controlling the locking means comprising a finger rigidly mounted with said rotative body, an operating wheel loosely mounted with respect to said body carrying coil springs designed to engage with said finger, a control lever for actuating said operating wheel for selectively engaging said pawls with said notches, and means for operating the hoist.

6. In vehicle dumping mechanism, a hoist including a hoist platform, said platform comprising a pair of beams, a stationary section rigidly secured therebetween and movable sections on each side of said stationary section adapted to displace on upward movement of the hoist, and means on said beams for preventing downward or upward movement respectively of said movable sections when said platform is in raised or lowered position.

7. In combination with a scale platform, grain dumping mechanism comprising a hoist in the form of a piston and cylinder mounted below the scale platform, a piston rod connected to said piston and adapted to project above the level of the scale platform during operation, a hoist platform mounted on said piston rod and adapted to be flush with the scale platform in normal position, means for raising said hoist platform to a predetermined level, means in connection with said hoist platform separate from and overlying the scale platform for contacting with and supporting the main body of a vehicle not carried by the hoist platform, and means for operating the hoist.

8. The device as claimed in claim 7 in which said means is in the form a flanged beam hingedly attached to said hoist platform.

9. The device as claimed in claim 7 in which the means for contacting with and supporting the main body of a vehicle is detachably secured to the platform.

10. In combination with a scale platform, grain dumping mechanism comprising a hoist in the form of a piston and cylinder mounted below the scale platform, a piston rod connected to said piston and adapted to project above the level of the scale platform during operation, a hoist platform mounted on said piston rod and adapted to be flush with the scale platform in normal position, said hoist platform including a stationary section, means on said hoist platform novable on upward movement of the hoist to form a cradle for positively retaining the wheels of a vehicle, a cylinder head surrounding the piston rod and closing the top of the cylinder, means for locking the hoist platform at various levels including a rotative body mounted within the cylinder head and carrying a plurality of pawls, a locking bar rigidly mounted on the piston rod formed with notches therein adapted to be selectively engaged by said pawls, control means for operating said rotative body to engage said pawls with said notches during movement of the hoist, and means for operating the hoist.

11. In grain dumping mechanism including a hoist formed with a platform designed to elevate a vehicle driven thereonto, means for raising and lowering the hoist, a control member independent of said raising and lowering means for controlling the upward movement of said hoist, and means responsive to a predetermined setting of said control member for automatically stopping said hoist at different selected levels.

12. In combination with a scale platform grain dumping mechanism comprising a hoist in the form of a piston and cylinder mounted below the scale platform, a piston rod connected to said piston and adapted to project above the level of the scale platform during operation, a hoist platform mounted on said piston rod and adapted to be flush with the scale platform in normal position, means for stopping the hoist platform at various levels in its upward travel including a notched locking bar mounted on the piston rod a rotative body mounted adjacent the piston rod and a control member for said rotative body, said rotative body being designed, during the upward travel of the piston, to automatically engage with a selected notch in the locking bar according to a predetermined setting of the control member.

13. The device as claimed in claim 12 in which the rotative body is provided with an operating wheel loosely mounted thereon and designed to be rotated by the control member, resilient means mounted on said operating wheel, and an operating finger rigidly secured to the rotative body projecting between said resilient means.

14. In grain dumping mechanism including a hoist employing a piston and cylinder device designed to raise and lower the hoist, a platform for the hoist formed with a centre section secured to the free end of the piston, a pair of beams secured to the centre section in parallel relation having their ends projecting beyond said section on each side thereof, a pair of sections mounted on each side of the centre section between the projecting ends of said beams each capable of vertical movement to the extent of the depth of the beams, and means for supporting said pair of sections between the beams.

15. In combination with a scale platform, grain dumping mechanism comprising a hoist in the form of a piston and cylinder mounted below the scale platform, a piston rod connected to said piston and adapted to project above the level of the scale platform during operation, a hoist platform mounted on said piston rod and adapted to be flush with the scale platform in normal position, means for raising said hoist platform to a predetermined level, means in connection with said hoist platform overlying the scale platform for contacting with the rear cross bar of a sleigh to elevate the rear runners from the scale platform and support the main body of the sleigh not carried by the hoist platform, and means for operating the hoist.

16. In combination with a scale platform, grain dumping mechanism comprising a hoist in the form of a piston and cylinder mounted below the scale platform, a piston rod connected to said piston and adapted to project above the level of the scale platform during operation, a hoist platform mounted on said piston rod and adapted to be flush with the scale platform in normal position, means for raising said hoist platform to a predetermined level, means in the form of a unitary member hingedly connected to the hoist platform and slidably movable on the scale platform for contacting with and supporting the main body of a vehicle not carried by the platform, and means for operating the hoist.

In witness whereof I have hereunto set my hand.

JOHN McEACHERN.